Dec. 4, 1956 A. B. McLAUCHLAN 2,772,818
AUTOMATIC PROPORTIONING DEVICE
Filed June 1, 1954 4 Sheets-Sheet 1
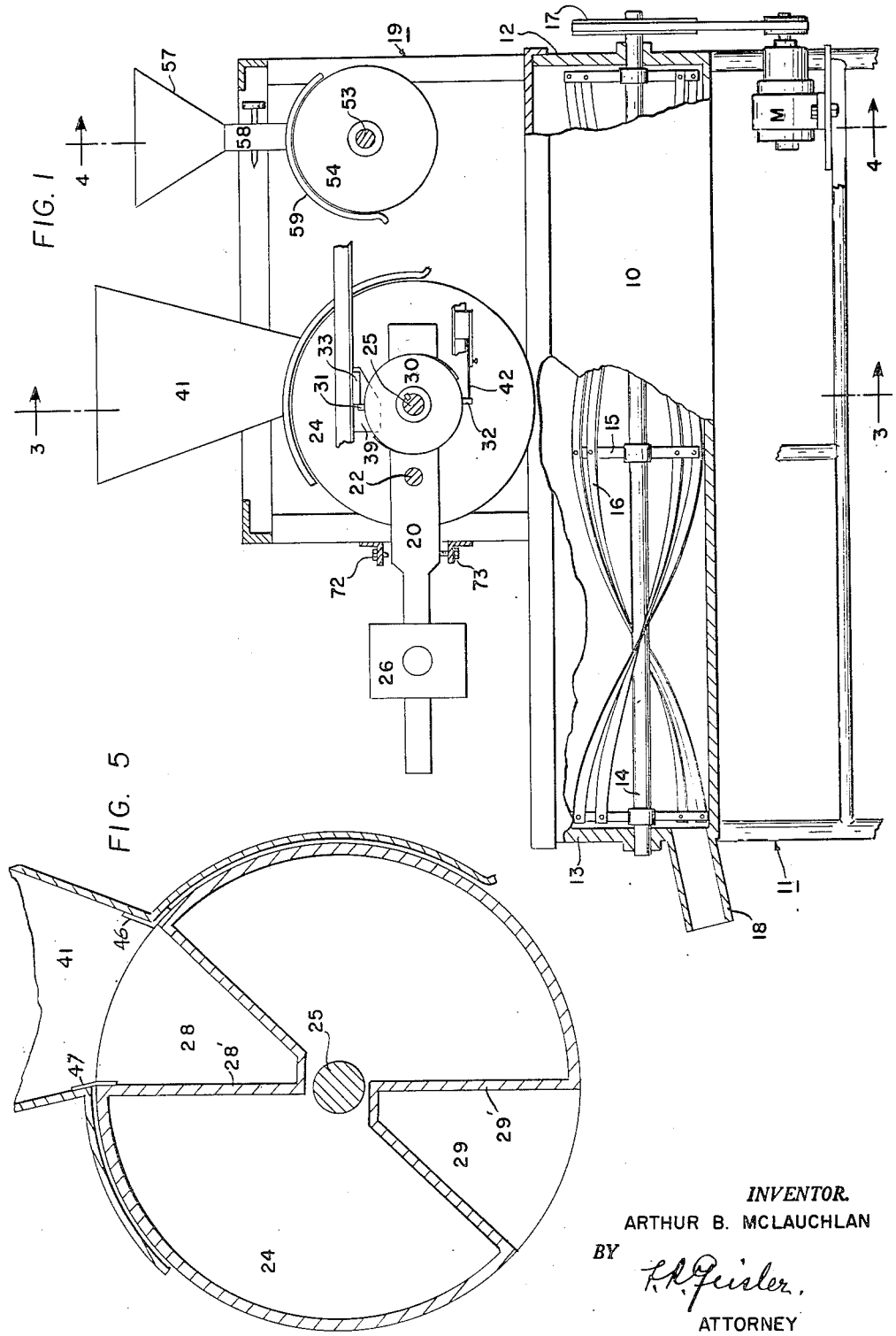
INVENTOR.
ARTHUR B. MCLAUCHLAN
BY
ATTORNEY

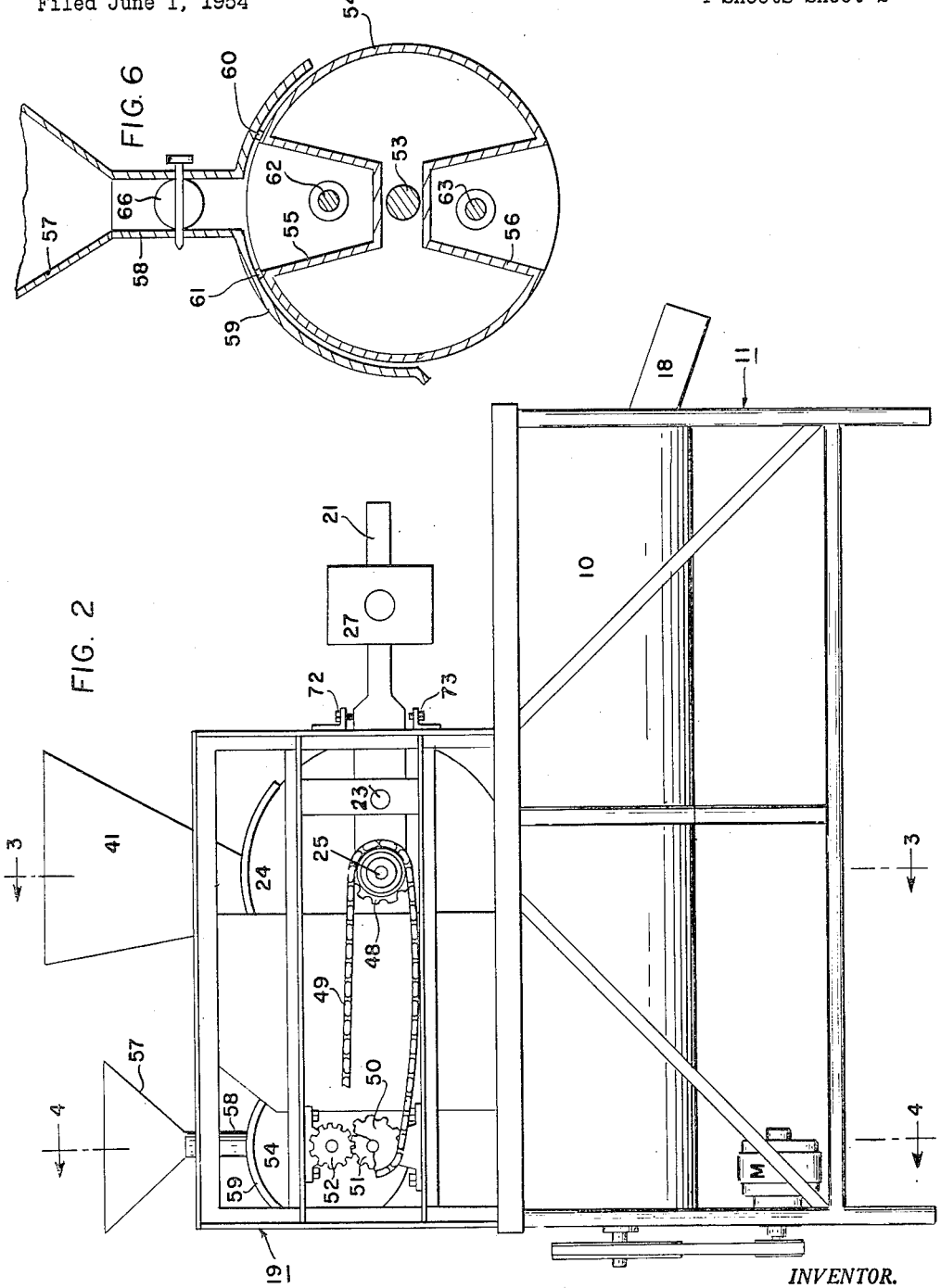

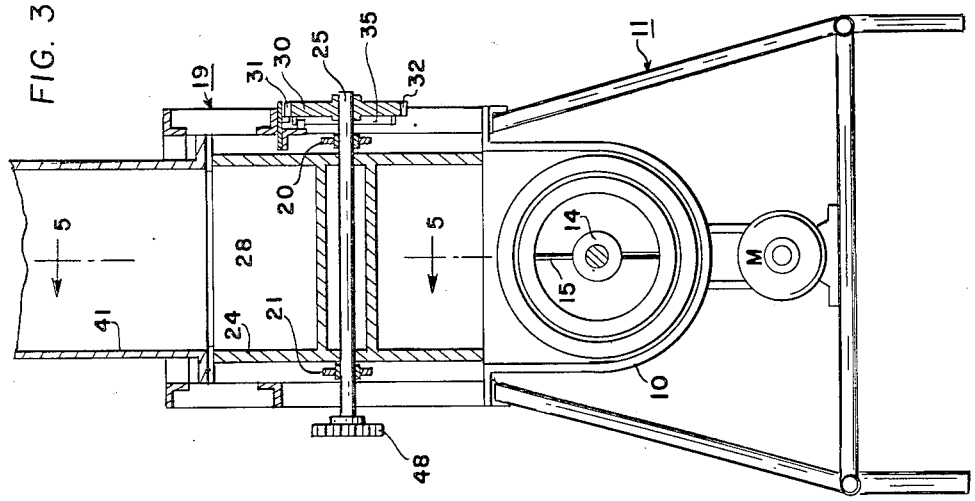
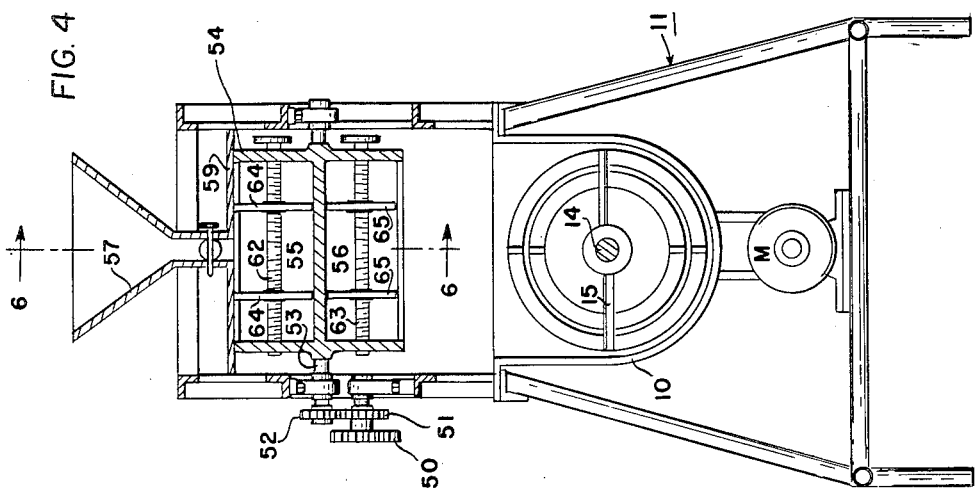

Dec. 4, 1956  A. B. McLAUCHLAN  2,772,818
AUTOMATIC PROPORTIONING DEVICE
Filed June 1, 1954  4 Sheets-Sheet 4
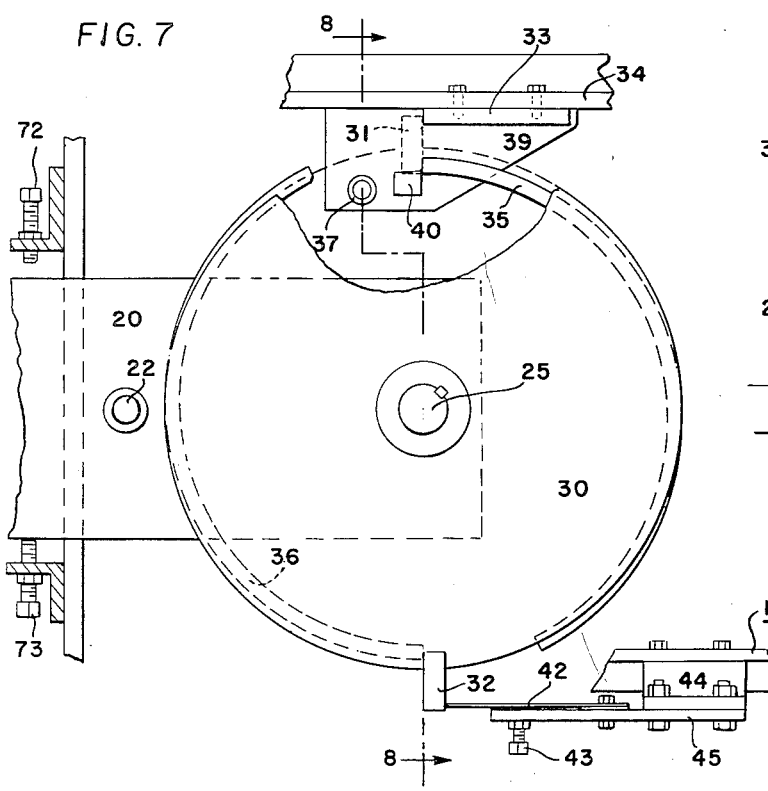
FIG. 7
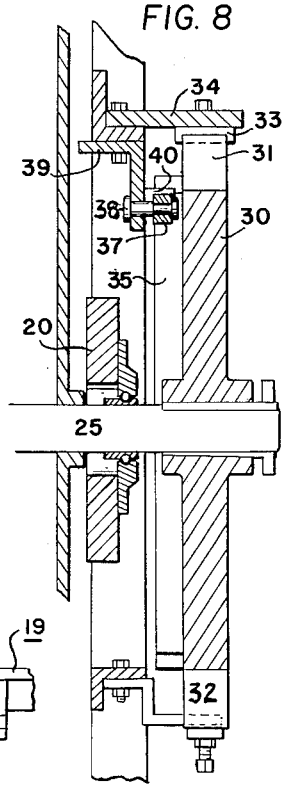
FIG. 8
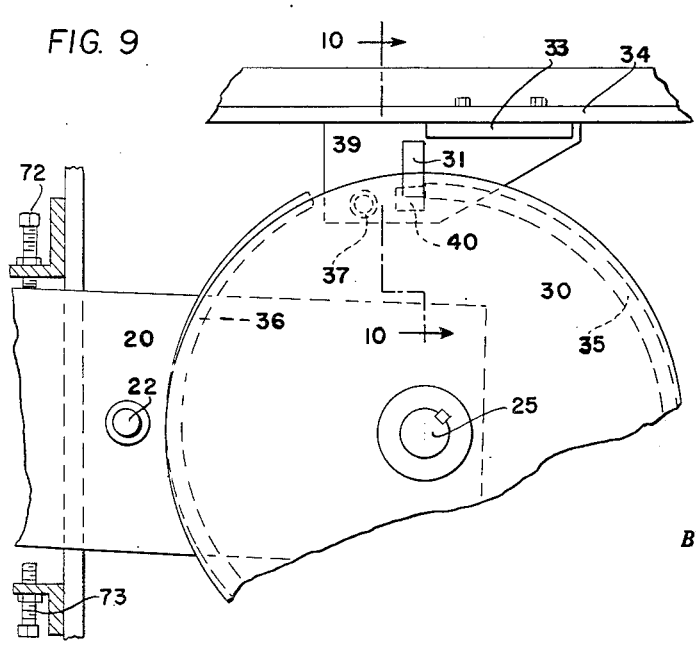
FIG. 9
FIG. 10
INVENTOR.
ARTHUR B. McLAUCHLAN
BY
*F.R.Geisler,*
ATTORNEY United States Patent Office
2,772,818
Patented Dec. 4, 1956

2,772,818

AUTOMATIC PROPORTIONING DEVICE

Arthur B. McLauchlan, Salem, Oreg.

Application June 1, 1954, Serial No. 433,692

8 Claims. (Cl. 222—368)

The present invention is concerned with means for automatically obtaining desired predetermined amounts or proportions of materials for mixing, particularly proportionate amounts of two food ingredients for a food mixture, as for example, in the mixing of fruits or berries with sugar.

This application is a continuation-in-part of application Serial No. 242,502 of Arthur B. McLauchlan and John A. Barry, filed under date of August 18, 1951, and entitled "Automatic Proportioner" now Patent No. 2,687,234 of August 24, 1954; and the invention described in this present application, like that described in the previously filed application, has, as its general object, the providing of improved means by which the desired relative proportions of the ingredients to be mixed will be automatically and accurately dispensed during each operation cycle.

The device of this present application is similar in most respects to that described in the previously filed application, Serial No. 242,502, and similarly employs a rotatable cylindrical drum having measuring pockets together with control means so arranged as to cause a cycle of operation of the device to take place each time a desired quantity of the principal ingredient to be mixed is deposited in a drum pocket, and similarly includes a second measuring drum connected with and operated by the first drum.

It has been found, however, that, with rapid, large scale operation in an automatic proportioner of this type, there is a tendency for the first drum either to overrun the limit stop provided for terminating each cycle of operation, and thus cause failure in the desired proportioning, or else for such drum to be suddenly stopped at the end of each cycle with such abruptness that excessive vibration or rebound of the drum or wear of the related parts of the device will occur.

A particular object of this present invention accordingly is to provide improved control means functioning with the first rotating drum which will eliminate such undesirable tendency in the operation of the device.

In the following brief description of the present invention, reference is to be made to the accompanying drawings, in which:

Figure 1 is a side elevation of a device, with the near side supporting frame members and housing wall removed for the sake of clarity, and also with a portion of the wall of the mixing trough broken away;

Figure 2 is an elevation taken from the opposite side of the device;

Figure 3 is a transverse vertical section taken on line 3—3 of Figures 1 and 2;

Figure 4 is a transverse vertical section taken on line 4—4 of Figures 1 and 2;

Figure 5 is a fragmentary enlarged vertical section taken on line 5—5 of Figure 3;

Figure 6 is a fragmentary enlarged vertical section taken on line 6—6 of Figure 4;

Figure 7 is a fragmentary side elevation of the control means connected with the principal proportioning and operating drum of the device and illustrating the position of the control means at the conclusion of one cycle of operation;

Figure 8 is a fragmentary section of the same control means taken on the line indicated at 8—8 in Figure 7;

Figure 9 is a fragmentary side elevation of the control means, similar in part to Figure 7, and illustrating the position of the control means at the start of a cycle of operation; and Figure 10 is a fragmentary section taken on line 10—10 of Figure 9.

A mixing trough 10 (Figures 1, 2, 3 and 4), having a semi-cylindrical bottom, is supported in a frame structure indicated in general by the reference character 11. Plates 12 and 13 (Figure 1) close the ends of trough 10, and a shaft 14, positioned along the axis of the semi-cylindrical trough bottom, is rotatably journaled in the end plates 12 and 13. Bracket arms 15, rigidly secured on the shaft 14, support spirally arranged vanes 16. The rear end of shaft 14, extending beyond end plate 12, carries a pulley 17 which is connected in suitable manner with a motor M supported in the frame 11 below the trough 10, and the spiral vanes 16 are so arranged that, with the rotation of shaft 14, the vanes not only mix the ingredients delivered into the trough 10, but also cause such ingredients to move along the trough to the discharging spout 18 while being mixed.

An upper housing frame 19 is supported on the frame 11 in the relative position shown in Figures 1 and 2. A pair of identical and normally horizontal arms 20 and 21 are located within opposite sides of the housing frame 19 and are connected by suitable cross members (not shown). The arms 20 and 21 are pivotally mounted on a pair of stub shafts 22 and 23, respectively, which stub shafts are supported in opposite sides of the housing frame 19 in horizontal alignment with each other.

The arms 20 and 21 form a mounting frame support for a cylindrical drum 24. This drum 24 is secured on an axial shaft 25 which is rotatably mounted in the arms 20 and 21 and is arranged parallel to the two stub shafts 22 and 23 for the arms. The drum shaft 25 is spaced a short distance rearwardly (or to the left, as viewed in Figure 1) from the stub shafts 22 and 23. Counterweights 26 and 27 are slidably mounted on the forward or outer ends of the arms 20 and 21, respectively, and are adjustably secured in desired position on these arms 20 and 21 by suitable means such as set screws.

The drum 24 is formed with two identical pockets 28 and 29 which are oppositely positioned in the drum, as shown in Figure 5, and which are both similarly off center. Thus, if the drum 24, when free to rotate with its supporting shaft 25, is normally stationary in the position illustrated in Figure 5, with the upper pocket 28 empty and with the walls 28' and 29' of the respective pockets vertical, the depositing of any material in the upper pocket 28 would cause the drum 21 to be overbalanced and thus to rotate (in clockwise direction as viewed in Figure 5), provided it is not restrained from doing so.

The purpose of the adjustable counterweights 26 and 27 on the arms 20 and 21 is to counterbalance the weight of the drum 24, together with the weight of any predetermined amount of material deposited in a drum pocket when such drum pocket is in the position of pocket 28 in Figure 5. Thus in effect the arms 20 and 21 are lever arms fulcrumed on the stub shafts 22 and 23 and having adjustable counterweights 26 and 27 for maintaining a predetermined load represented by the drum 24 and the contents of a drum pocket.

A flywheel disc 30 (Figures 1, 3, 7 and 8) is keyed on the end of the drum shaft 25 so as to rotate with the drum shaft and drum 24. A pair of diametrically opposite engageable members or fingers 31 and 32 are mounted in the periphery of the disc 30 and extend a short distance radially therefrom. These peripheral members are so located that they will be positioned in a vertical plane when either of the drum pockets 28 or 29 occupies the position illustrated by the upper pocket 28 in Figure 5. A stationary stop bar 33 is secured to a bracket plate 34 attached to the frame 19, this stop bar being positioned in the relative location shown in Figures 1 and 7 and being adapted to be engaged by either of the members 31 or 32 when the corresponding drum pocket is in upper or filling position and when the drum shaft-supporting arms 20, 21 are in the horizontal position of Figure 1, as later explained.

A pair of arcuate cam elements 35 and 36 (Figures 7, 8 and 9) are secured to the inner face of the flywheel disc 30. Preferably these two cam elements are formed, as shown, from identical sections of a ring, the outer peripheral diameter of which is the same as that of the disc 30. These two identical cam elements are positioned on the inside face of the disc 30 in such manner that the centers of curvature of the cam elements will be oppositely spaced from the center of the disc 30 but equidistant from the disc center. Furthermore, each cam element extends in clockwise direction (as viewed in Figures 7 and 9) and thus in the direction of rotation of the disc 30 and drum 24, beginning at a point in radial alignment with one of the radially-extending members 31 or 32 and terminating a short distance from the other radially-extending member, the distance of the cam elements from the center of the disc 30 being the least at the starting point of the cam element and greatest at the termination point of such cam element, as apparent from Figure 7.

A roller 37 is mounted on a stationary stub shaft 38 (Figure 8) carried by a bracket 39 attached to the frame 19 and this roller 37 engages the cam elements 35 to 36 with the rotation of the disc 30. A contact lug 40 (Figures 7 to 10) is also mounted on the bracket 39 a short distance from the roller 37 and in the relative position shown best in Figure 7, and this lug 40 likewise is adapted to engage the cam elements 35 and 36 and does so in the manner and for the purpose later explained.

A discharging hopper 41 (Figures 1, 2, 3 and 5), the open bottom of which corresponds approximately in area to the openings for the pockets 28 and 29 in the cylindrical surface of the drum 24, is supported in the top of the upper frame 19 in the stationary position shown. The sides of this hopper 41 terminate at the bottom in outward flanges which are curved to correspond to the cylindrical surface of the drum 24. When the drum 24 is in the normally raised position illustrated in Figures 1, 2 and 5, these flanges follow the drum surfaces for some distance with only slight spacing between the flanges and the drum surfaces.

When the drum 24 is in the normal raised position illustrated in Figures 1, 2 and 5, with the counterweights 26 and 27 positioned so as to counterbalance the weight of the drum together with the weight of the desired amount of material (as, for example, berries) to be measured and delivered into the trough 10, the delivery of the berries into the hopper 41 (by any suitable means not shown) will result in berries being deposited in the upper pocket of the drum 24 (in this instance, pocket 28). However, when the weight of the deposited berries in such drum pocket passes beyond the predetermined amount, the combined weight of the drum and berries will then overbalance the counterweights 26 and 27 and cause the forward ends of the arms 20 and 21, on which the counterweights are carried, to move upwardly to the extent permitted by the adjustable pairs of limit stops 72 and 73 (Figures 1, 2 and 7), and cause the drum to drop to lower position. The adjustable stops 72 and 73 for each of the arms 20 and 21 may be formed in any suitable manner, but in the device illustrated these stops consist of adjustable screws carried by transversely-extending angle irons fastened to the front of the frame 19 above and below the arms 20 and 21.

The engaging members 31 and 32 extend such distance radially from the periphery of the disc 30, and the stationary stop bar 33 is so arranged with respect to the disc 30, that when the drum 24 and drum shaft 25 and disc 30 are in the normal raised position (as illustrated in Figures 1 and 7), one of the engaging members 31 or 32 will engage the stop bar 33 and thus prevent rotation in clockwise direction of the disc 30 and drum 24; but that when the deposit of material in a drum pocket causes the counterweights 26 and 27 to be overbalanced and the drum 24 and disc 30 to drop to lower position (as indicated in Figure 9), the engaging member 31 or 32 will clear the stop bar 33.

When the engaging member 31 or 32 has cleared the stop bar 33 due to the lowered position of the drum 24 and disc 30 resulting from the deposit of material in a pocket of the drum, as previously mentioned, the weight of the berries (or other material) in the upper pocket of the drum will, since the drum is then free to rotate, produce clockwise rotation of the drum 24 (as viewed in Figures 1 and 5), with the result that the berries in the upper pocket of the drum will be discharged into the trough 10.

When the contents of the drum pocket have been discharged into the trough 10 the reduction in weight will again cause the drum to be returned to normal raised position and an engaging member again to come into contact with the stop bar 33. While ordinarily this could be expected to occur with each half rotation of the drum during the operation of the device, if no other control means were provided, in actual practice and with large heavy proportioning drums in such devices, I have found that the drum may sometimes rotate so quickly that more than the 180° of rotation will take place before the drum is brought back up to normal raised position. In other words, in such circumstance the next engaging element 32 will pass under the stop bar 33 instead of engaging the stop bar and would enable the drum to continue rotating for another 180° even though the second drum pocket had not received any appreciable deposit of material. Such condition would, of course, result in failure of the delivery of accurate proportions for mixing in the trough 10.

To prevent the possibility of such occurrence as mentioned in the previous paragraph, I provide the additional control means which constitutes an important feature of the present invention. As the disc 30 rotates, in unison with the rotating drum, one of the cam elements 35 or 36 will engage the roller 37. As apparent from Figure 7, the engagement of cam element 36, for example, with roller 37, which would take place when approximately the mid portion of cam element 36 had reached roller 37, the continued rotation of disc 30 will cause the disc (and with it drum shaft 25 and drum 24) to be lifted to normal raised position until the next peripheral member 32 comes into engagement with the stop bar 33. Thus any possibility of a peripheral member failing to engage the stop bar 33, that is to say any possibility of the drum failing to return to raised position by the time it has completed 180° of rotation, regardless of the momentum attained by the drum, is completely eliminated.

As each cam element passes over roller 37, it also passes over the stationary contact lug 40, in turn. The frictional engagement of a cam element with the stationary lug 40 serves as a brake for gradually retarding the rotating speed of the drum. As will be noted from Figure 7, the top face of the lug 40 is slightly inclined upwardly in the direction of travel of the cam element in order to provide more extended surface contact with such moving cam element.

The cam elements 35 and 36 terminate in radial alignment with the forward faces of the peripheral members 31 and 32, respectively, as shown in Figure 7. Thus when the peripheral member 31, for example, has been brought into contact with the stop bar 33 the cam element 35 will have completed its travel over the lug 40 and the disc 30, drum shaft 25 and drum will be free to drop into lowered position as soon as the predetermined amount of material is deposited in the corresponding drum pocket, thus enabling the rotation of the drum to start.

As previously mentioned, the relative positioning of the roller 37, contact lug 40, and cam elements 35 and 36 is such that each cam element will contact the roller 37 and lug 40 preferably at approximately the mid point. This contact of the cam element with the roller gradually lifts the disc 30 and drum shaft 25 and drum. While this in itself exerts a retarding tendency on the rotation of the drum, the additional frictional contact of the cam element with the lug 40 adds a further retarding tendency, with the result that the drum rotation is gradually slowed down until the drum is brought to a definite stop by engagement of a peripheral member 31 or 32 with the stop bar 33.

Even with the slowing down of the rotational speed of the drum during the latter portion of each 180° of rotation, as above described, there might still be a possibility, under certain conditions, that this slowing down of the drum rotation would not prevent some rebound when the peripheral member 31 or 32 contacts the stop bar 33, or the possibility that the drum, with both pockets empty, would show a tendency to rotate slightly in the reverse direction after the peripheral member has contacted the stop bar 33. The occurrence of this would prevent the upper pocket in the drum from being positioned in exact registration with the bottom of the hopper 41. Accordingly, I provide a flat spring 42 (Figure 7), the free end of which will engage the rear face of the lower peripheral member on the disc 30 and thus eliminate all possibility of any rebound or reverse rotation of the drum. This flat spring 42 in addition also serves to retard the speed of the drum near the end of the 180° of rotation when the lower moving peripheral member on the disc 30 comes into contact with the top face of the flat spring 42. The action of the flat spring in retarding the rotation of the drum can furthermore be modified to some extent by adjusting the screw 43 which bears against the lower face of the flat spring 42, as shown in Figure 7. The secured end of the flat spring 42 is clamped between a bracket 44, attached to the frame 19, and a bottom bar 45, and the adjusting screw 43 is mounted in the forward end of the bottom bar 45, as shown.

Flexible wiper blades 46 and 47 (Figure 5) are provided at the bottom of the hopper 41. These flexible blades are of sufficient size to maintain rubbing contact with the cylindrical surface of the drum 24 even when the drum is in lowered rotating position, and thus these blades prevent any berries from passing or leaking out between the bottom of hopper 41 and the periphery of the drum 44. The hopper 41 preferably is large enough to accommodate sufficient berries to fill each drum pocket immediately, as each pocket in turn comes into registration with the hopper, and thus the cycles are repeated in rapid succession as long as desired, or as long as the supply of berries for delivery into the trough 10 continues.

On the opposite end of the drum shaft 25 from the disc 30, a sprocket wheel 48 (Figures 2 and 3) is keyed on the shaft 25. A sprocket chain 49 connects sprocket wheel 48 with a sprocket wheel 50 near the rear of the frame 19. A gear 51 (see also Figure 4) keyed to the same stub shaft with the sprocket 50 meshes with a gear 52 which is keyed on the end of a shaft 53 rotatably mounted in the frame 19.

A second drum 54 (Figures 1, 2, 4 and 6), somewhat similar to drum 24, in that it has two oppositely arranged pockets 55 and 56, is secured on the shaft 53. The pockets 55 and 56 in this second drum 54 are preferably centered on the drum instead of being off center, and also the drum 54 preferably is smaller than the drum 24.

In the example illustrated in the drawings, where the larger drum is intended to be used for delivering a predetermined amount of berries at successive intervals into the trough 10, the second drum 54 is intended to be used similarly for delivery of a predetermined amount of sugar with each delivered amount of berries.

A hopper 57 is supported on the top portion of the frame 19 above the drum 54. A tube 58 (Figures 1, 2 and 6) leads from the bottom of this funnel-shaped hopper to the top of the drum 54. A shield 59 surrounds the bottom end of the tube 58 and, as shown in Figures 1 and 6, this shield is curved to correspond with the cylindrical surface of the drum 54 and is spaced only a very slight distance from the drum surface.

Wiper blades 60 and 61 (Figure 6) on the shield 59 prevent any of the sugar or other material delivered into the drum pockets from leaking out between the shield 59 and the cylindrical surface of the drum 54.

A pair of rotatable adjusting shafts 62 and 63 (Figures 4 and 6), with the opposite ends of each formed with right and left hand threads respectively, extend across the drum 54 through the pockets 55 and 56 respectively. Pairs of adjustable vertical partitioning slides 64, 64 and 65, 65 are mounted on these bars 62 and 63 respectively. The purpose of these slides, as apparent from Figure 4, is to adjust the capacity of the drum pockets 55 and 56 for receiving the material (sugar) delivered from the hopper 57 into the drum pockets. A damper 66 (Figure 6) is mounted in the tube 58 to enable the passage of material from the hopper 57 to be shut off entirely when desired.

Thus, since the two drums 24 and 54 are connected by means of the sprocket chain 49, each half rotation of the drum 24 results in the half rotation of the connected drum 54. With each half rotation of the drums a predetermined amount of berries, as provided for by the adjusted position of the counterweights 26 and 27, is discharged into the trough 10, and simultaneously a predetermined amount of sugar, determined by the adjusted position of the partitioning slides 64, 64 and 65, 65 in the pockets of the drum 54, is discharged into the trough. As the berries and sugar are dropped into the trough 10 with each cycle of operation, the two ingredients are mixed together by the moving vanes 16 in the trough 10 and the mixed ingredients are finally discharged from the trough spout 18. The depositing of the ingredients from the trough will continue automatically as long as desired, or as long as the supply of ingredients lasts, and the proportions in the meanwhile will be constantly maintained.

Varying the proportions may be easily accomplished either by adjusting the counterweights 26 and 27 or by adjusting the partitioning slides 64 and 65, or by combining both such adjustments.

I claim:

1. In a device of the character described including a frame, a rotatable drum having measuring pockets, and a rotatable shaft for said drum, a movable support in said frame for said shaft enabling said shaft and drum to be moved down and up, from normal raised position to lowered position, in response to the deposit of predetermined amounts of material in said pockets, a disc secured on said shaft, members on said disc corresponding in arrangement to said drum pockets respectively, a stop adapted to be contacted by said members when said drum is in normal raised position but not capable of being contacted by said members when said drum is in lowered position, and means on said disc, together with coacting means mounted on said frame and engaged by said first mentioned means, for lifting said disc and therewith said drum to normal raised position as the rotation of said disc brings one of said members into registration with said stop.

2. In an automatic proportioning device including a frame, a rotatable drum having measuring pockets, and a rotatable shaft for said drum, movable supporting means in said frame for said shaft enabling said shaft and drum to be moved down and up, from normal raised position to lowered position, in response to the deposit of predetermined amounts of material in said pockets, a flywheel secured on said shaft, peripheral members on said flywheel corresponding in arrangement to said drum pockets respectively, a stationary stop bar adapted to be contacted by said peripheral members when said drum is in normal raised position but not capable of being contacted by said peripheral members when said drum is in lowered position, and cam elements on said flywheel, together with a coacting roller mounted in fixed position on said frame and engaged by said cam elements, for lifting said flywheel and therewith said drum to normal raised position as the rotation of said flywheel brings one of said peripheral members into registration with said stationary stop bar.

3. In an automatic proportioning device of the character described including a frame, a rotatable drum having measuring pockets, and a rotatable shaft for said drum, a movable support in said frame for said shaft enabling said shaft and drum to be moved down and up, from normal raised position to lowered position, in response to the deposit of predetermined amounts of material in said pockets, a disc wheel secured on said shaft, members on said disc wheel corresponding in arrangement to said drum pockets respectively, a stop adapted to be contacted by said members when said drum is in normal raised position but not capable of being contacted by said members when said drum is in lowered position, means on said disc wheel, together with coacting means mounted in fixed position on said frame and engaged by said first mentioned means, for lifting said disc wheel and therewith said drum to normal raised position as the rotation of said disc wheel brings one of said members into registration with said stop, and a contact member, mounted for engagement by said members whenever said drum has been returned to normal raised position, for preventing any reverse rotation of said disc wheel and said drum.

4. In an automatic proportioning device of the character described including a frame, a rotatable drum having off-center measuring pockets, and a rotatable shaft for said drum, movable supporting means in said frame for said shaft enabling said shaft and drum to be moved down and up, from normal raised position to lowered position, in response to the deposit of predetermined amounts of material in said pockets, a flywheel disc secured on said shaft, peripheral members on said flywheel disc corresponding in arrangement to said drum pockets respectively, a stationary stop bar on said frame adapted to be contacted by said peripheral members when said drum is in normal raised position but not capable of being contacted by said peripheral members when said drum is in lowered position, cam elements on said flywheel disc together with a coacting roller mounted on said frame and engaged by said cam elements for lifting said flywheel disc and therewith said drum to normal raised position as the rotation of said flywheel disc brings one of said peripheral members into registration with said stationary stop bar, and a spring mounted for engagement by said peripheral members whenever said drum has been returned to normal raised position, for preventing any reverse rotation of said flywheel disc and said drum.

5. In an automatic proportioning device of the character described including a frame, a rotatable drum having off-center measuring pockets, and a rotatable shaft for said drum, a movable support in said frame for said shaft enabling said shaft and drum to be moved down and up, from normal raised position to lowered position, in response to the deposit of predetermined amounts of material in said pockets, a disc secured on said shaft, members on said disc corresponding in arrangement to said drum pockets respectively, a stop adapted to be contacted by said members when said drum is in normal raised position but not capable of being contacted by said members when said drum is in lowered position, means on said disc together with coacting means mounted on said frame and engaged by said first mentioned means for lifting said disc and therewith said drum to normal raised position as the rotation of said disc brings one of said members into registration with said stop, and a stationary contact lug on said frame positioned for frictional engagement with said first mentioned means when said first mentioned means engages said coacting means, for retarding the rotational speed of said disc and therewith of said drum when said disc and said drum are brought to normal raised position.

6. In an automatic proportioning device of the character described including a frame, a rotatable drum having off-center measuring pockets, and a rotatable shaft for said drum, movable supporting means in said frame for said shaft enabling said shaft and drum to be moved down and up, from normal raised position to lowered position, in response to the deposit of predetermined amounts of material in said pockets, a flywheel secured on said shaft, peripheral members on said flywheel corresponding in arrangement to said drum pockets respectively, a stationary stop bar adapted to be contacted by said peripheral members when said drum is in normal raised position but not capable of being contacted by said peripheral members when said drum is in lowered position, cam elements on said flywheel together with a coacting roller mounted in fixed position on said frame and engaged by said cam elements for lifting said flywheel and therewith said drum to normal raised position as the rotation of said flywheel brings one of said peripheral members into registration with said stationary stop bar, and stationary means on said frame positioned for frictional engagement with said cam elements when said cam elements engage said coacting roller, for retarding the rotational speed of said flywheel and therewith of said drum when said flywheel and said drum are brought to normal raised position.

7. In an automatic proportioning device of the character described including a frame, a rotatable drum having off-center measuring pockets, and a rotatable shaft for said drum, a movable support in said frame for said shaft enabling said shaft and drum to be moved down and up, from normal raised position to lowered position, in response to the deposit of predetermined amounts of material in said pockets, a disc wheel secured on said shaft, members on said disc wheel corresponding in arrangement to said drum pockets respectively, a stop adapted to be contacted by said members when said drum is in normal raised position but not capable of being contacted by said members when said drum is in lowered position, means on said disc wheel together with coacting means mounted in fixed position on said frame and engaged by said first mentioned means for lifting said disc wheel and therewith said drum to normal raised position as the rotation of said disc wheel brings one of said members into registration with said stop, a stationary contact lug on said frame positioned for frictional engagement with said first mentioned means when said first mentioned means engages said coacting means, for retarding the rotational speed of said disc wheel and therewith of said drum when said disc wheel and said drum are brought to normal raised position, and a spring mounted for engagement by said members whenever said drum has been returned to normal raised position, for preventing any reverse rotation of said disc wheel and said drum.

8. In an automatic proportioning device of the character described including a frame, a rotatable drum having off-center measuring pockets, and a rotatable shaft for said drum, movable supporting means in said frame for said shaft enabling said shaft and drum to be moved down and up, from normal raised position to lowered position, in response to the deposit of predetermined amounts of material in said pockets, a flywheel disc secured on said shaft, peripheral members on said flywheel disc corresponding in arrangement to said drum pockets respectively, a stationary stop bar on said frame adapted to be contacted by said peripheral members when said drum is in normal raised position but not capable of being contacted by said peripheral members when said drum is in lowered position, cam elements on said flywheel disc together with a coacting roller mounted on said frame and engaged by said cam elements for lifting said flywheel disc and therewith said drum to normal raised position as the rotation of said flywheel disc brings one of said peripheral members into registration with said stationary stop bar, a stationary contact lug on said frame positioned for frictional engagement with said cam elements when said cam elements engage said coacting roller, for retarding the rotational speed of said flywheel disc and therewith of said drum when said flywheel disc and said drum are brought to normal raised position, and an adjustable spring mounted for engagement by said peripheral members whenever said drum has been returned to normal raised position, for preventing any reverse rotation of said flywheel disc and said drum.

References Cited in the file of this patent

UNITED STATES PATENTS

| | | |
|---|---|---|
| 422,747 | Earle | Mar. 4, 1890 |
| 506,007 | Lacey | Oct. 3, 1893 |
| 1,760,407 | Hebebrand | May 27, 1930 |
| 2,230,846 | Pettett | Feb. 4, 1941 |
| 2,565,801 | Byers | Aug. 28, 1951 |